(No Model.)

F. L. BRANDON.
NUT LOCK.

No. 301,085. Patented July 1, 1884.

Witnesses:
Wm. Duvall
J. R. Sittell

Inventor:
per F. L. Brandon,
C. A. Snow & Co.
Attys.

UNITED STATES PATENT OFFICE.

FRANCIS L. BRANDON, OF HICKSVILLE, OHIO.

NUT-LOCK.

SPECIFICATION forming part of Letters Patent No. 301,085, dated July 1, 1884.

Application filed September 6, 1883. Renewed May 29, 1884. (No model.)

*To all whom it may concern:*

Be it known that I, FRANCIS L. BRANDON, a citizen of the United States, residing at Hicksville, in the county of Defiance and State of Ohio, have invented a new and useful Nut-Lock, of which the following is a specification, reference being had to the accompanying drawings.

This invention relates to nut-locks; and its object is to provide a nut-lock possessing superior advantages in point of simplicity, inexpensiveness, durability, security, and general efficiency.

Figure 1:
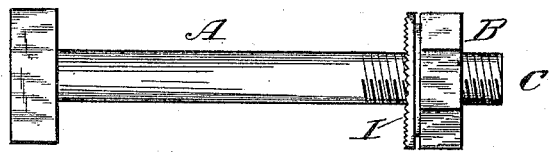
Figure 2:
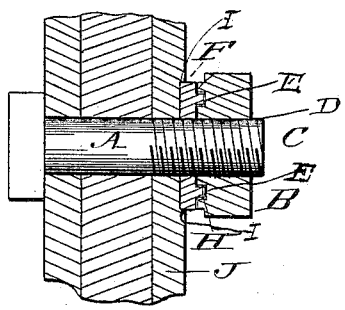
Figure 3:
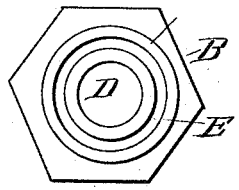
Figure 4:
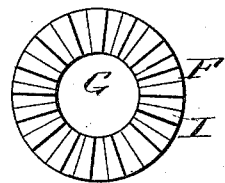

In the drawings, Figure 1 is a side view of a bolt and nut embodying my improvements. Fig. 2 is a sectional view of the same applied to a railroad-joint in locked position. Fig. 3 is a face view of the nut. Fig. 4 is a face view of the washer locking-plate.

Referring to the drawings, A designates the bolt, which may be of the usual construction, which receives the nut B on its screw-threaded end C, as shown, the nut being provided with the usual screw-threaded eye, D, and having an annular groove, E, formed in its inner face around said eye.

F is a washer plate or disk, which is formed with an eye, G, by which it may be slipped on the bolt A, and also has an annular rib, H, around said eye in its outer face, that is received into the groove E when the nut is screwed up against the washer. The inner face of the washer is provided with teeth I, which in Figs. 1, 2, and 3 are serrations, the serrations being preferably formed radially, as shown in Fig. 4. When the bolt is placed in position, and the washer and nut on the end of the bolt, the nut may be screwed home, which will bind the serrations of the washer into the contact-surface J, (which in the present instance is the fish-plate,) while the contact-points of the washer and nut will bind together and retain their position by friction.

It will be understood that the entire annular surfaces are in frictional contact, so that the tendency of the nut to turn is met by this friction at every point on the annular contact-surfaces, the number of the latter being increased by having an annular rib enter a corresponding groove, when the sides and edge of the rib are in contact with the sides and bottom of the groove, and form three contact-surfaces.

I claim as my invention—

The combination of the bolt, the washer-plate having the eye, the series of radial serrations on its inner face, and an annular rib around its eye on its outer face, and the nut having the eye and the annular groove on its inner face and around its eye, said groove receiving the said rib, substantially as and for the purpose set forth.

In testimony that I claim the foregoing as my own I have hereto affixed my signature in presence of two witnesses.

FRANCIS L. BRANDON.

Witnesses:
 FRANK L. FORLOW,
 WESLEY DOWELL.